J. J. BUTCHER.
WHEEL FOR VEHICLES.
APPLICATION FILED JAN. 17, 1913.
1,142,487.
Patented June 8, 1915.
3 SHEETS—SHEET 1.
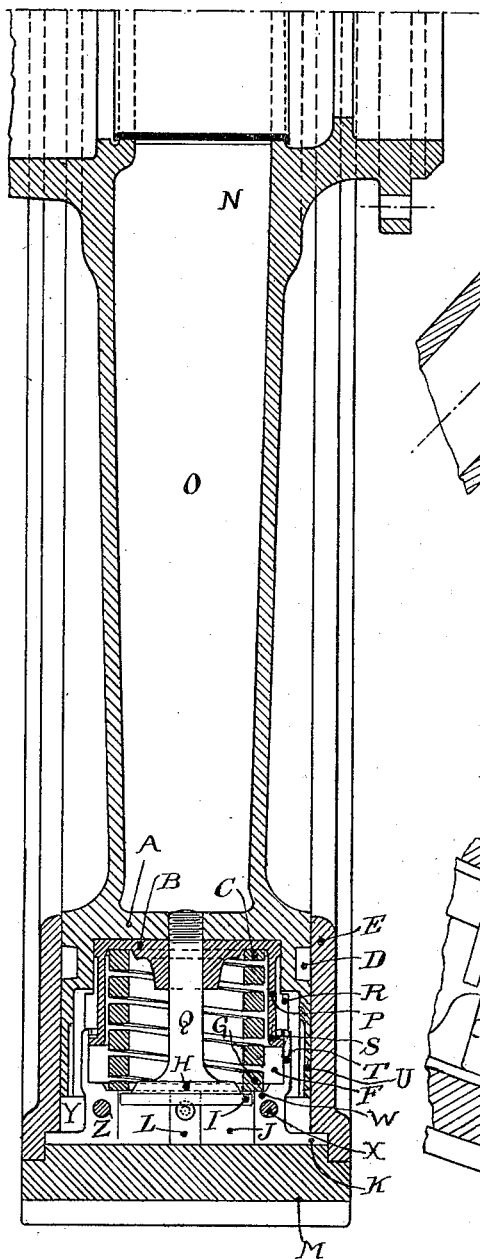
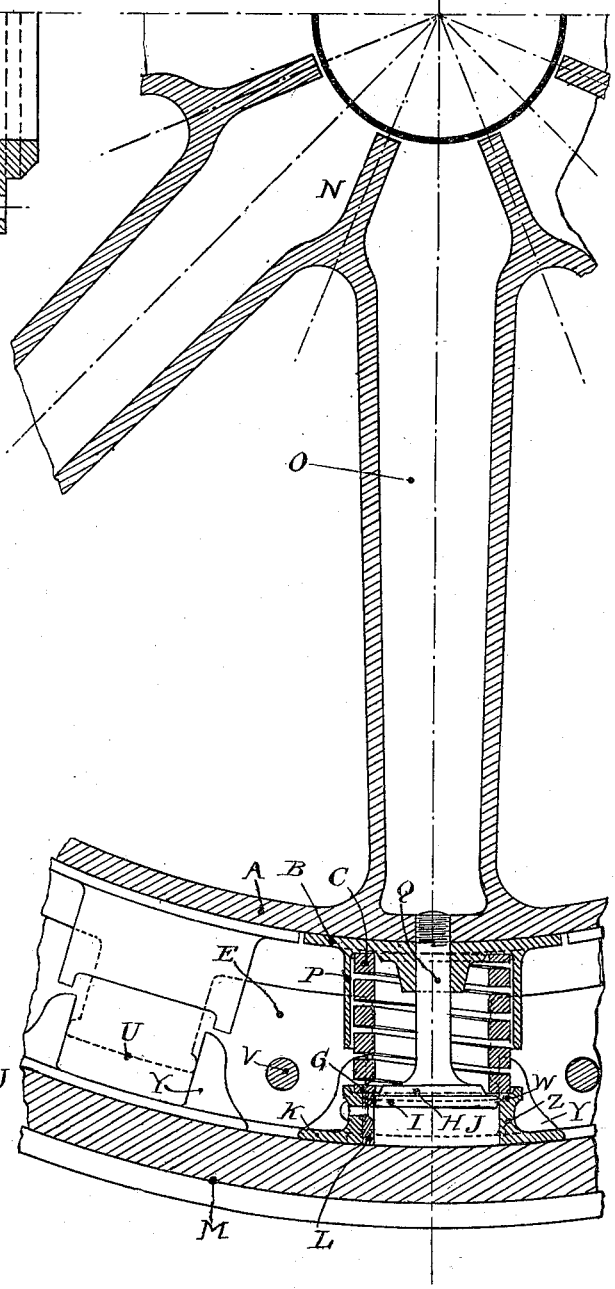
WITNESSES:
INVENTOR:

J. J. BUTCHER.
WHEEL FOR VEHICLES.
APPLICATION FILED JAN. 17, 1913.

1,142,487.

Patented June 8, 1915.
3 SHEETS—SHEET 2.

WITNESSES:

INVENTOR.
Joseph J. Butcher

THE NORRIS PETERS CO., PHOTO-LITHO., WASHINGTON, D. C.

J. J. BUTCHER.
WHEEL FOR VEHICLES.
APPLICATION FILED JAN. 17, 1913.

1,142,487.

Patented June 8, 1915.
3 SHEETS—SHEET 3.

WITNESSES:

INVENTOR.

UNITED STATES PATENT OFFICE.

JOSEPH J. BUTCHER, OF SOUTH FRAMINGHAM, MASSACHUSETTS.

WHEEL FOR VEHICLES.

1,142,487. Specification of Letters Patent. Patented June 8, 1915.

Application filed January 17, 1913. Serial No. 742,596.

*To all whom it may concern:*

Be it known that I, JOSEPH JOHN BUTCHER, a subject of His Majesty the King of Great Britain and Ireland, residing at South Framingham, in the county of Middlesex and State of Massachusetts, in the United States of America, have invented a new and useful Wheel for Vehicles, of which the following is a specification.

My invention consists of a wheel so constructed that the tire may be forced, under the effect of the jolts and shocks to which it is subjected on rough roads, into a position eccentric with regard to the hub, its normal concentricity to the hub and axle being insured by springs distributed around the wheel and supporting the tire, and by the friction set up by, and consequent upon, their action.

The object of my invention is to relieve the body of the vehicle from the shocks and bumps incident to traveling over ordinary roads, and to do so in such a manner as to involve the least possible disturbing effect to the wheel due to the load upon the axle, when the vehicle is either standing still or moving over a perfectly smooth road.

I attain these objects by the mechanism illustrated in the accompanying drawings, in which:—

Figure 3:
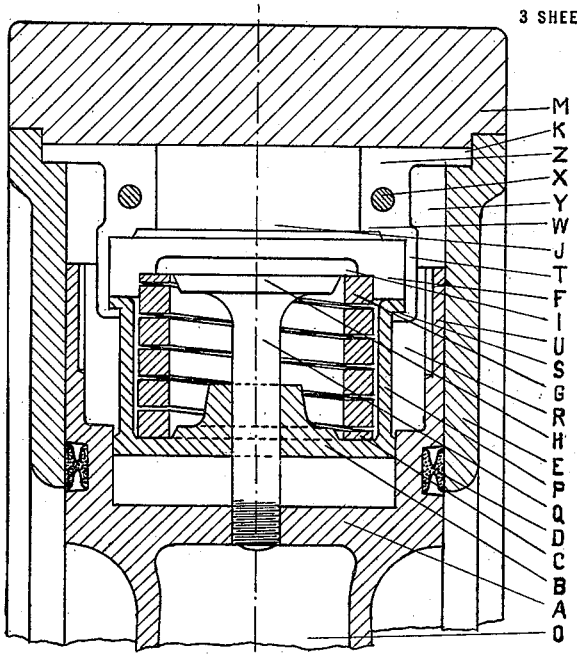
Figure 4:
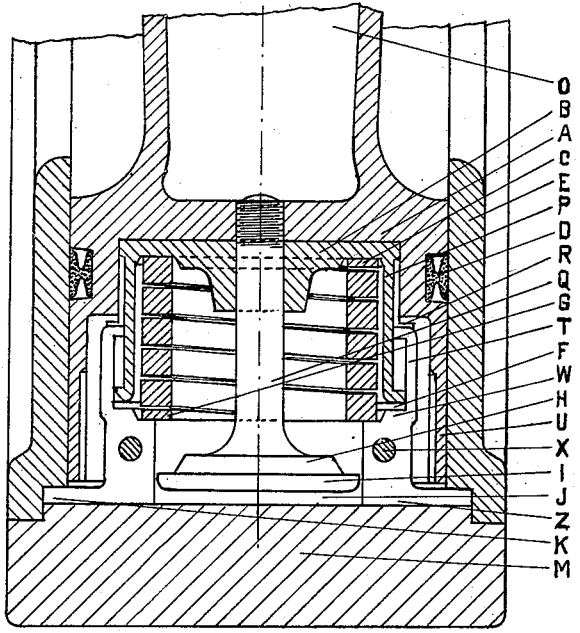
Figure 5:
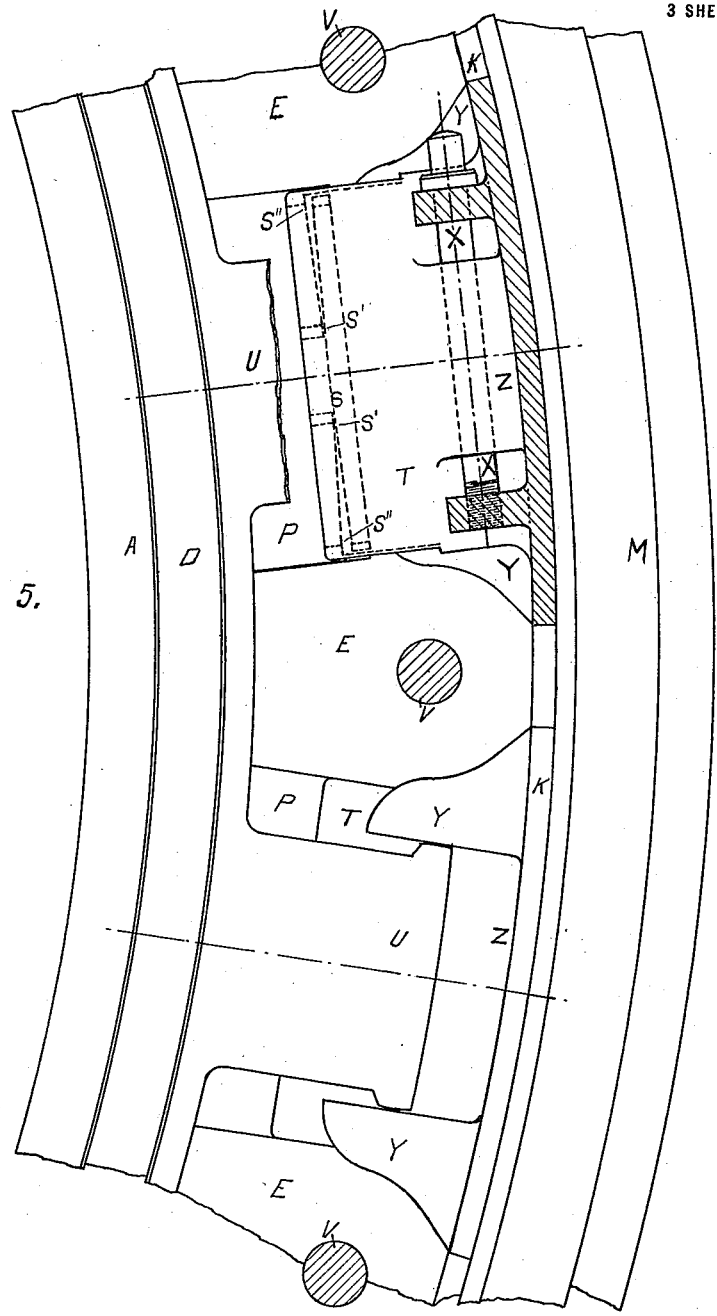

Figure 1 is a partial transverse section through my wheel, and Fig. 2 is a vertical sectional view along the lines 2—2 of Fig. 1. Fig. 3 is a section (through the tire and felly) of the upper part of my wheel, showing a spring compressed by the hub being forced downward and away from this part of the tire; Fig. 4 is a similar section of the lower part of my wheel, showing a spring compressed by the hub being forced downward and toward this part of the tire. Fig. 5 is a side view of a portion of the tire of my wheel with one of the flanges E removed, and in the upper part of the figure the outer shoe is shown sectionally, the section being taken behind the projections Y Y on the near side of the shoe, so as to expose the parts which interlock.

Similar letters indicate similar parts.

N is the hub, O the spokes, A the felly of the wheel.

M is the tire, and E are flanges recessed into M and supporting it against any force tending to bend it.

V are bolts fastening the two flanges E together, and the construction is such as to allow of the movement of these bolts, together with the flanges and tire attached, relatively to the body of the wheel NOA, and in all directions within a limited range on the plane of its motion.

C are springs arranged at suitable intervals between the tire and the felly, the effort of which always tends to bring the tire into a position concentric with the body of the wheel. The pressure of the superincumbent load upon the tire, and also the effect of bumping upon the ground tends to force the lower part of the tire nearer the axle, and it therefore forces the higher part of the tire away from the axle, and the sides (that is those parts upon and about the same level as the hub) of the tire are thus moved upward past the axle, so as to slide past those springs which are upon or about the level of the hub.

Z is a shoe sliding upon the inner face of the tire M, and having flanges K constructed upon it, entering into grooves formed between the tire and the flanges E, so as to retain the shoe Z at all times in juxtaposition with the tire M. The shoe Z may therefore slide upon the inner surface of the tire M, but cannot leave that surface.

W is an annular shoulder formed upon the shoe Z, and forms a bearing upon which the outer part of the spring G presses. Consequently, when the part of the tire M adjacent to any spring is forced toward the hub the shoulder W acts so as to compress the spring.

H is a cap or head attached by the stem Q to the felly, and having the flange I, which partly overlaps the outer end of the spring, and forms a shoulder to take a bearing upon part of it. The flange I is smaller than the opening in the shoulder W, and is capable of moving within it in a radial direction.

B is the inner shoe upon which the end of the spring C nearest the hub takes a seat. B bears upon the felly A, and is prevented from sliding upon it by the stem Q which thus maintains the angular position of the shoe. The shoe B is free to slide out from the hub upon the stem Q.

P is a wall formed upon the shoe B, and surrounding the spring C.

T is a wall formed upon the shoe Z, and partially surrounding the outer end of the spring G. The walls P and T are interlocked at S, so that when any part of the tire M moves away from the hub N it carries the shoe Z with it, and the interlock between the shoes at S compels the shoe B to follow the shoe Z away from the hub and sliding upon the stem Q, and as the shoe B forms the seat for the inner end of the spring C and the flange I prevents the outer end of the spring G from moving farther from the felly, this combined action compresses the spring. Thus whether the portion of the tire which is adjacent to a spring moves in toward the hub, or out and away from it, the result of the combination of parts is to produce compression in the spring; and in the operation of the wheel under load and impact, when the tire is driven into a position eccentric to the hub, every spring in the entire circle, except those which are at the moment upon, or nearly upon, a horizontal level with the hub, is more or less compressed, and all the springs, both above and below the center, become load bearing and shock resisting springs.

In the action of this combination friction plays a very important part. As the body of the wheel is forced down past the center of the tire, the parts of the felly upon the level of the hub (and also, in a less degree, all other parts of the felly, except those upon a nearly vertical line through the axle) are forced downward past the tire, and therefore carry both the springs and the inner and outer shoes with them. Thus the outer shoes have to slide down the inner surface of the tire, and under the pressure of the springs cause a very considerable friction, which is added to the direct force of the springs in resisting the movement of the tire. This friction will itself largely absorb the effect of shock, and also prevent a too sudden spring reaction. To insure that the side springs press outwardly upon the tire I usually make the inner face of the flange I (which forms the inner seat for the outer end of the spring G) a little beyond the spring when the tire is concentric, or when that part of it which is adjacent to the spring is at normal distance from the felly. There will therefore be a slight movement of the tire out of concentricity before the springs at the upper part exchange their bearing from the annular shoulder upon the shoe Z to the inner face of the flange I. Throughout this slight interval the upper and lower springs are opposed—that is the upper springs tend to force the tire up and the lower springs tend to force it down, the one set partially neutralizing the effect of the other set; the whole load bearing and shock resisting effort of the entire group of springs arranged around the wheel being very slight, excepting as regards their indirect action in setting up frictional resistance. But directly the upper springs begin to press upon the flange I, and through the stem Q pull upon the felly, the resistance to the eccentric movement of the tire is very greatly increased, as the pressure of the lower springs is no longer neutralized, while the pressure of the upper springs is added to them, together with the frictional resistance.

U are two projections, one upon each side of the wheel and attached to it, and one pair of such projections is formed for each spring. Upon the outer shoe Z are formed jaws Y, one pair of such jaws engaging with the projection U at one side of the spring, and a second pair of jaws engaging with a similar projection at the other side of the spring. The projections U slide out and in between the inclosing jaws Y, and, as the projections U are attached to the felly A, the jaws compel the shoes Z to maintain their angular positions constant with regard to the hub notwithstanding the movements of the tire. This mechanism is for the purpose of overcoming the frictional resistance of the tire when sliding past the shoe, and tending to displace it with regard to the spring.

The shoes Z are usually made in halves, the halves being attached to one another by the bolts X. This is to allow the interlocking flanges at S to be engaged, as, if those formed upon the outer shoe Z were in one piece they would not pass those formed upon the inner shoe B. The interlocking flanges upon Z are engaged with those upon B before the two halves of the outer shoe Z are bolted together.

The useful effect of a resilient wheel tire is its capacity to soften the effect of shocks and jars due to an irregular road bed, and to prevent them from injuring the superstructure. For the wheel tire to yield to the load upon it when there is no jar is of little or no use, and the ideal tire would remain concentric, as well as truly circular, under the influence of load, and be perfectly resilient against sudden shock.

A near approach to these ideal conditions can be brought about by my mechanism if the springs are mounted between the tire and the felly under such an initial compression that they will, while the tire is practically concentric or only so far disturbed as to bring the upper springs home against the flanges I, bear the load of the vehicle with scarcely any further departure from concentricity. In this case all the remaining resilience of all the springs is efficient against shock. As the springs all around the wheel are, under these conditions, load bearing, and as in addition the frictional resistance to movement is very high, the structure will very strongly counteract jars and shocks.

The space J allows of the outward movement of the cap H when, at the lower part of the wheel, the tire is pushed upward toward the hub. The space R allows the wall T, and its flange S, to slide toward the hub outside the wall P under the same conditions. The space F allows the wall P with its flange S to slide toward the tire inside the wall T. D Fig. 1 are two grooves around the felly for the reception of suitable packing rings to prevent the escape of the lubricant required for the mechanism described, and also to prevent the entry of water and mud as the tire flanges slide over the felly.

The packing rings referred to, which are shown in the grooves illustrated in Fig. 1, are also shown within the grooves marked D in Figs. 3 and 4. They consist of leather rings formed like two hydraulic U leathers placed back to back, so that the U with the flanges facing outward will prevent water and mud from entering, while the U with the flanges facing inward will prevent the grease from escaping.

When the tire is pushed upward from the ground into an eccentric position the curves of the tire at the sides of the wheel are no longer concentric with the curves of the felly, and the shoe Z is tilted slightly in relation to the shoe B. At the parts of the tire below the wheel center where the tire has approached the wheel body the interlocking flanges S will be open, and the space between them will allow of this slight tilting to which the springs will accommodate themselves. But at the parts of the tire above the axle, where the space between the tire and the felly has been increased, the springs will be pulled outward by means of the flanges S, which will therefore be pressed firmly together. To allow of this tilting I therefore make the meeting faces of these flanges slightly thicker in the vicinity S Fig. 5 where the two halves of the shoe Z unite, and thin them off a little on either side of this split toward S'' Fig. 5 so as to allow of a slight rocking movement. It is obvious that this local disturbance of concentricity, which is normal to the mechanism, might be accommodated in various other less simple ways.

L is a key which prevents the cap H from turning, and so unscrewing its stem from the felly, and the stem is first screwed home and adjusted before the shoe Z is fitted into place. The shoe Z is in turn prevented from turning by the flanges E.

Having now fully described my invention, I claim:—

1. A wheel, the tire of which is supported at a distance from the hub member and felly by spiral springs; studs attached to the felly carrying caps against which the outer ends of the springs moving outwardly make contact; shoes with flanges entering circumferential grooves retaining them adjacent to the tire, and having shoulders forming seats for the outer ends of the springs; extensions, integral with the outer shoes, telescoping with extensions integral with the inner shoes, and stops or flanges upon these extensions interlocking with each other, so as to limit the distance to which the inner and outer shoes can move away from each other; flanges upon the inner shoes forming seats for the springs at their inner ends, substantially as described.

2. A wheel, the tire of which is supported at a distance from the hub member and felly by spiral springs; stops secured to the felly and partially overlapping the outer ends of the springs so as to limit their outward movement, combined with shoes retained in working contact with the tire, having shoulders upon them also making contact with the outer ends of the springs, and retaining them at a fixed distance from the tire at those parts where the cap and the felly approach it, substantially as described.

3. A wheel, the tire of which is supported at a distance from the hub member and felly by spiral springs; springs one end of each of which is partially overlapped by a shoulder attached to the hub member, and partially overlapped by a shoulder attached to the tire member, the outer ends of the springs sometimes taking their seats upon the one shoulder and sometimes upon the other, substantially as described.

4. A wheel, the tire of which is supported at a distance from the hub member and felly by spiral springs, shoes riding radially upon guide studs attached to the felly, and acting as seats for the inner ends of the springs between them and the felly; walls or projections upon these shoes telescoping with walls or projections upon the outer shoes shouldered for the outer ends of the springs, and interlocking flanges arresting the outward telescopic travel when the tire is concentric with the hub, substantially as

JOSEPH J. BUTCHER.

Witnesses:
 JOSIAH S. DEAN,
 STEPHEN P. CUSHMAN.

Copies of this patent may be obtained for five cents each, by addressing the "Commissioner of Patents, Washington, D. C."